(12) United States Patent
Tiberghien

(10) Patent No.: US 7,044,161 B2
(45) Date of Patent: May 16, 2006

(54) QUICK CONNECTION FOR REMOVABLY JOINING TWO PIPES AND USE OF SUCH A CONNECTION

(75) Inventor: Alain-Christophe Tiberghien, Sevrier (FR)

(73) Assignee: Staubli Faverges, Faverges (FR)

( * ) Notice: Subject to any disclaimer, the term of this patent is extended or adjusted under 35 U.S.C. 154(b) by 0 days.

(21) Appl. No.: 10/959,990

(22) Filed: Oct. 8, 2004

(65) Prior Publication Data
US 2005/0081929 A1   Apr. 21, 2005

(30) Foreign Application Priority Data
Oct. 17, 2003   (FR) .................................. 03 12188

(51) Int. Cl.
*F16L 37/28*   (2006.01)
(52) U.S. Cl. .............................. 137/614.05; 137/614.03
(58) Field of Classification Search ........... 137/614.03, 137/614.04, 614.05
See application file for complete search history.

(56) References Cited

U.S. PATENT DOCUMENTS

| | | | |
|---|---|---|---|
| 2,868,563 A | | 1/1959 | Wood |
| 4,483,510 A | | 11/1984 | Palau |
| 5,090,747 A | * | 2/1992 | Kotake ........................ 285/305 |
| 5,143,347 A | * | 9/1992 | Lee et al. ................. 251/149.6 |
| 5,494,073 A | * | 2/1996 | Saito ...................... 137/614.03 |
| 5,494,074 A | | 2/1996 | Ramacier, Jr. |
| 5,535,985 A | * | 7/1996 | Larbuisson .............. 251/149.9 |

FOREIGN PATENT DOCUMENTS

| | | |
|---|---|---|
| FR | 1 561 337 | 3/1969 |
| FR | 2 063 800 A | 7/1971 |
| FR | 2 514 855 A | 4/1983 |

* cited by examiner

*Primary Examiner*—Kevin Lee
(74) *Attorney, Agent, or Firm*—Dowell & Dowell, P.C.

(57) ABSTRACT

A quick connect coupling including male and female elements that are adapted to fit axially in each other and each includes a valve that is displaced to an open position by engagement by a fixed pusher part of each element when they are being fitted together. The female element is provided with a locking member in which a part of the male element is received and which is reciprocally movable in a radial direction with respect to an axis of fit of the elements between two positions in which the locking member respectively allows or opposes the separation of the male and female elements and wherein the engaging surfaces of the valves and pusher parts is such that no open volumes or voids are created therein in which a liquid may collect during assembly or disassembly of the male and female elements.

10 Claims, 2 Drawing Sheets

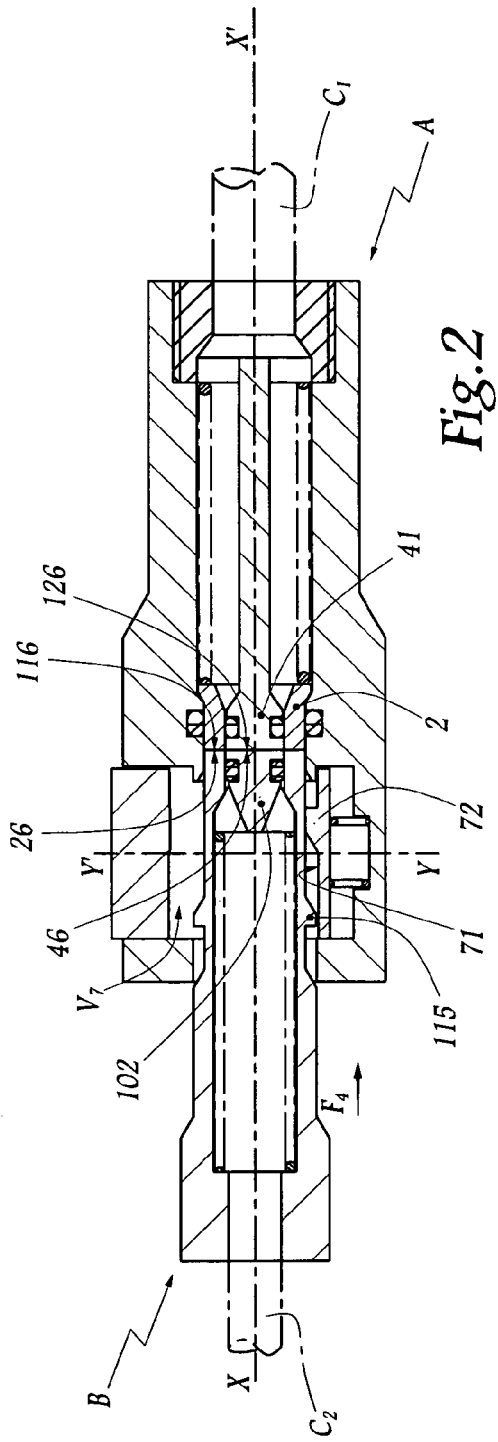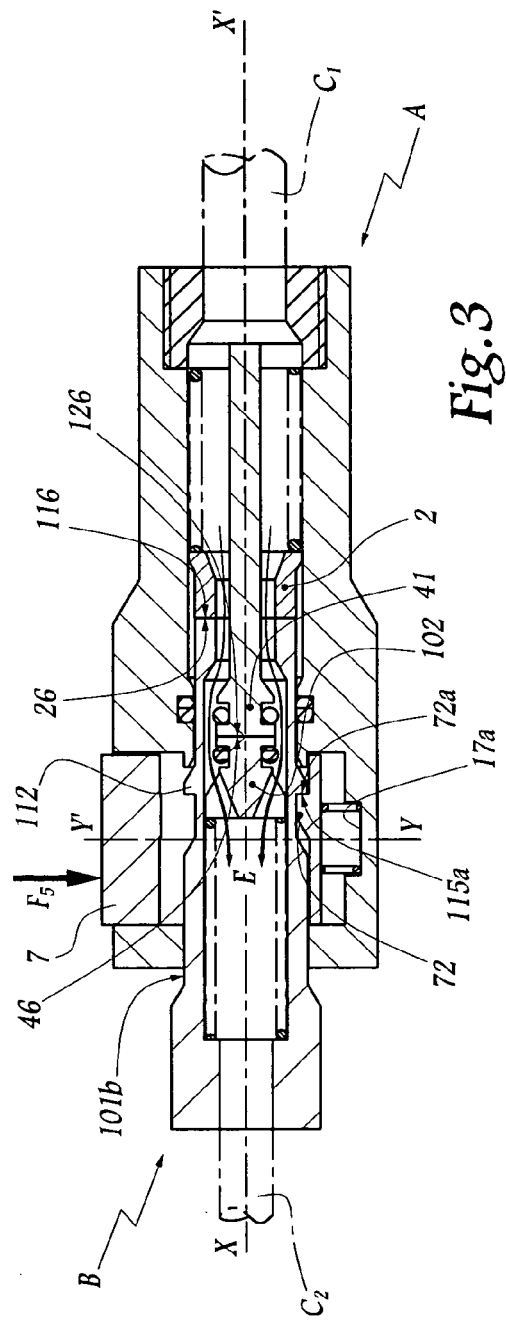

QUICK CONNECTION FOR REMOVABLY JOINING TWO PIPES AND USE OF SUCH A CONNECTION

BACKGROUND OF THE INVENTION

The present invention relates to a quick connection for removably joining of pipes conveying fluid under pressure, as well as to a use of such a connection.

BRIEF DESCRIPTION OF THE RELATED ART

In the domain of connections, it is known, for example from FR-A-1 561 337, to provide in each element of a connection with a mobile valve elastically loaded or forced towards a position of closure of the flow through the corresponding element. Each of these valves is intended to be displaced, against the elastic load to which it is subjected, by a fixed part of the other element. This is generally referred to as a double-closure connection. Such connections have the advantage of limiting the risks of leakage to a maximum, insofar as the male element, on the one hand, and the female element, on the other hand, are open only when the act of fitting is sufficiently advanced to provoke the displacement of the afore-mentioned valves. These connections present the drawback that they are relatively difficult to maneuver insofar as the locking of the male and female elements in fitted position is effected by balls mounted in the female element and and that are engaged in a retaining groove made on the outer radial surface of the male element. The position of these balls is controlled by a ring or a sleeve arranged around the body of the female element and which must be displaced parallel to the direction of fitting, i.e. parallel to the forces of relative separation of the male and female elements due to the pressure of the fluid and to the means for elastically loading the valves. As a result, these known connections are sometimes difficult to maneuver, particularly when the pipes to which they are connected contain fluids under relatively high pressure or when the rings are soiled by greasy products.

U.S. Pat. No. 5,494,074 discloses a connection of which the male and female elements are each provided with a valve whose projecting parts come into abutment on each other, with the result that a dead volume is created between the valves, which, when the connection is opened, induces leakages.

FR-A-2 063 800 discloses a quick connection which, in the embodiment of FIGS. 4 and 5, comprises male and female elements equipped with valves, while a tubular element interposed between these valves defines a dead volume generating drainings or leakages, particularly when the connection is opened. In addition, the elastic U-shaped blade used for locking the connection in fitted configuration is unreliable.

It is a more particular object of the invention to overcome these drawbacks by proposing a novel quick connection of the double-closure type, whose manipulation is facilitated.

SUMMARY OF THE INVENTION

In that spirit, the invention relates to a quick connection for removably joining two pipes through which a fluid under pressure passes, this connection being constituted by two elements, male and female, adapted to fit axially in each other and each comprising a body inside which a valve is mobile, a fixed part of each element being adapted to displace the mobile valve of the other element when they are being fitted. This connection is characterized in that the female element is provided with a member in which may be introduced a part of the male element and which is mobile in translation in a radial direction with respect to the axis of fit of the male and female elements, between a first position in which this member allows the separation of these elements, and a second position where this member opposes a withdrawal of the male element from the female element, and in that, when the male and female elements are separated, their respective fixed part and mobile valve together define, respectively in the male element and in the female element, complementary volumes of which the opposite surfaces may be in surface abutment on each other.

With the invention, the coupling of the male and female elements can be controlled because of the mobile member which moves transversely with respect to the direction of fit. It should be noted that the invention goes against the understanding of the person skilled in the art who, up to the present time, tended to consider that a quick connection of double closure type required an axisymmetrical locking, such as obtained with balls, otherwise there was a risk of misalignment of the valves and fixed parts provided respectively on the male and female elements. It has been proven that the mobile retaining member, which exerts on the male element a transverse effort, is not incompatible with the functioning of the closure valves.

In addition, the invention makes it possible to minimize the dimensions of a connection according to the invention insofar as a member with transverse displacement necessitates less surface in order to be efficiently manipulated by a user than a sleeve such as the one known in the state of the art. In addition, the control effort which is exerted by the user on the control member is perpendicular to the axis of the connection, therefore with little risk of slippage.

Finally, because of surface abutment of the opposite surfaces of the fixed parts and of the mobile valves, the creation of a dead volume between the male and female elements is avoided, such a volume being capable of inducing leaks during the manipulation of the connection.

The connection of the invention therefore makes it possible efficiently to perform a triple function of double-closure, of easy manipulation and of tightness upon connection/disconnection, by a structure which is at the same time reliable, compact and economical.

According to advantageous but non-obligatory aspects, a connection may incorporate one or more of the characteristics set forth in the dependent Claims.

The invention also relates to the use of at least one connection as described hereinabove for the creation of a circuit for circulation of heat-exchange fluid with a view to cooling electrical or electronic equipment. Such use takes advantage of the fact that the elements constituting a quick connection according to the invention may be of relatively modest dimensions and a large number can be mounted in a control box.

BRIEF DESCRIPTION OF THE DRAWINGS

The invention will be more readily understood on reading the following description of an embodiment of a quick connect coupling in accordance with the invention, given solely by way of example, and made with reference to the accompanying drawings, in which:

FIG. 2 is a section similar to FIG. 1 on a smaller scale, during an intermediate step of coupling of the male and female elements; and FIG. 3 is a section similar to FIG. 2, wherein the male and female elements are coupled.

DESCRIPTION OF PREFERRED EMBODIMENT

Figure 1:
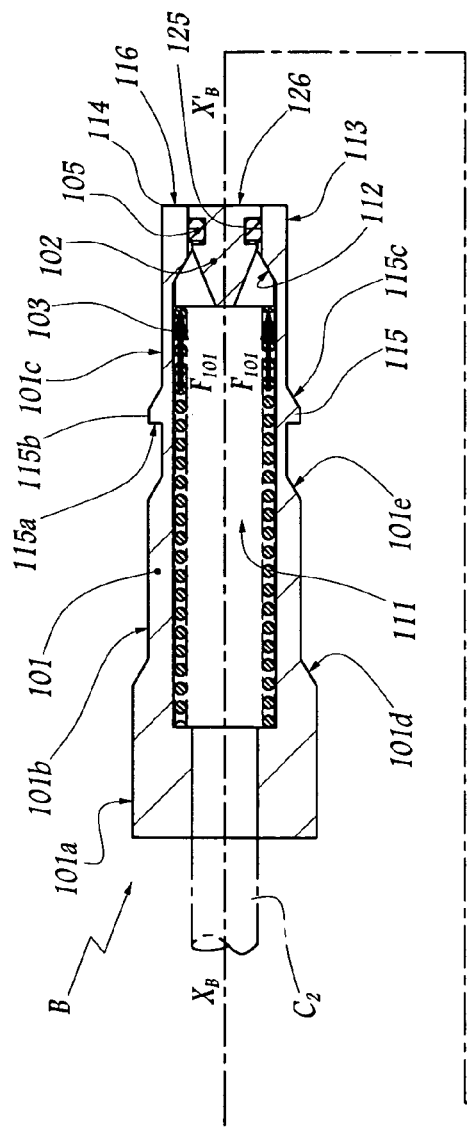
FIG. 1 is a longitudinal section through a quick connect coupling according to the invention, in a first configuration where its male and female elements are not yet coupled.
Figure 1:
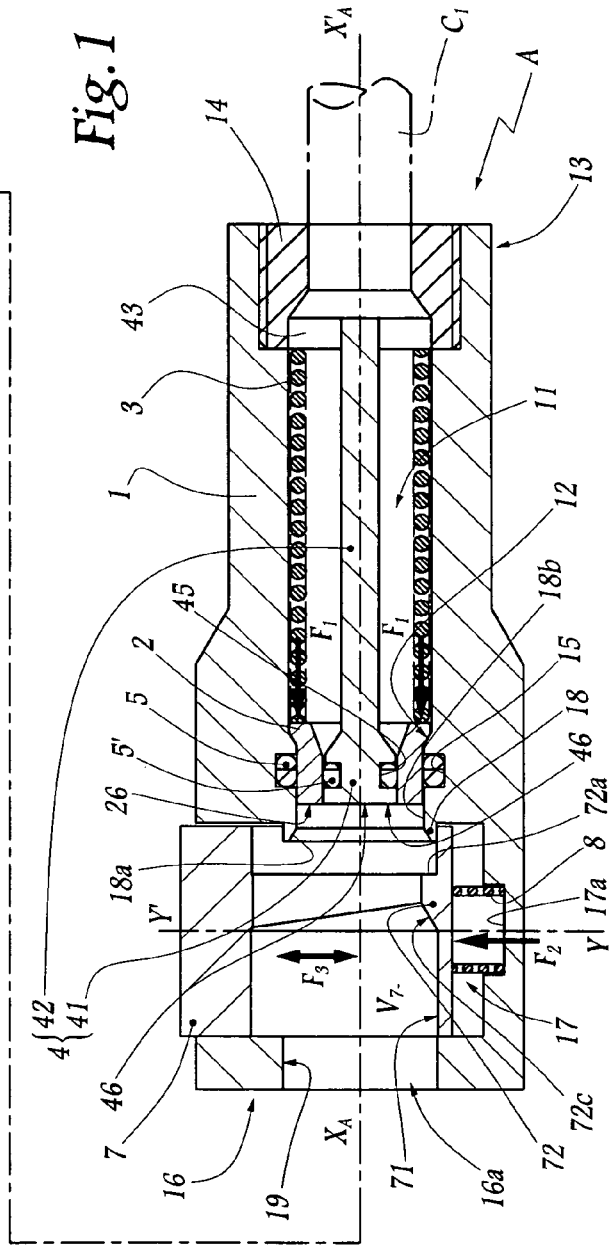

Referring now to the drawings, the connection or quick connect coupling shown in FIGS. 1 to 3 comprises a female element A and a male element or connector B, respectively connected to an upstream pipe $C_1$ and to a downstream pipe $C_2$. The upstream pipe $C_1$ is, itself, connected to a source of fluid under pressure (not shown).

The outside shape of the body 1 of the female element A is cylindro-conical with circular base, centered on an axis $X_A$–$X'_A$ which is also the longitudinal axis of a conduit 11 inside the body 1 and in which is disposed a valve 2 mobile along axis $X_A$–$X'_A$ with respect to the body 1. This valve 2 is intended to come into abutment against a seat 12 formed by an inner truncated surface of the body 1. The valve 2 is subjected to an elastic effort or force $F_1$ exerted by a spring 3, this effort $F_1$ tending to apply it against the seat 12. The valve 2 is centered on a head 41 of a pusher element 4 of which the shank 42, which is in one piece with the head 41, extends up to a rear part 13 of the body 1 where it is maintained in position by three tabs 43 disposed substantially at 120° with respect to one another about axis $X_A$–$X'_A$ and wedged by a ring 14 screwed in the body 1 and on which the pipe $C_1$ is connected.

The pusher element 4 is centered on axis $X_A$–$X'_A$.

Two O-rings 5 and 5' are respectively provided in a groove 15 made on the inner radial surface of the body 1 and in a groove 45 provided on the outer radial surface of the head 41, these O-rings 5 and 5' being intended to ensure a tight contact with the valve 2 when the latter is in abutment against the seat 12.

16 denotes the front part of the body 1 in which is made an orifice 16a for the introduction of the male element B. The surface 26 of the valve 2 and the surface 46 of the pusher element 4 which are oriented towards the orifice 16a are substantially coplanar in the configuration of FIG. 1 and perpendicular to axis $X_A$–$X'_A$.

Between the head 41 and the orifice 16a, the body 1 is provided with a housing 17 in which is arranged a lock button 7 elastically loaded by an effort $F_2$ exerted by a spring 8 arranged between the button 7 and the bottom 17a of the housing 17. The displacement of the button 7 under the effect of the effort $F_2$ is limited by a stop 18. The button 7 is reciprocally movable in the direction of the double arrow $F_3$ in FIG. 1, i.e. in a direction Y–Y' perpendicular to axis $X_A$–$X'_A$. It defines a volume $V_7$ in which a part of the male element B may be introduced and which extends from the orifice 16a up to the proximity of the surfaces 26 and 46.

At the level of its inner radial surface 71 which defines the volume $V_7$, the button 7 is provided with a tooth 72.

The male element B is provided with a cylindro-conical body 101 inside which is formed a conduit 111 for circulation of fluid under pressure, this conduit being in communication with the pipe $C_2$. The body 101 is centered on an axis $X_B$–$X'_B$ which is also an axis of symmetry of the conduit 111 and which is provided to be aligned with axis $X_A$–$X'_A$ when elements B and A are fitted in each other. Inside the body 101 is disposed a valve 102 elastically loaded by an effort or force $F_{101}$ exerted by a spring 103 and tending to return the valve 102 towards a configuration of closure of the opening of the conduit 111 on the front side of the element B, the valve 102 in that case being in abutment on an inner truncated seat 112 formed by the body 101.

The valve 102 is provided with a groove 125 in which is arranged an O-ring 105 intended to come into abutment against the inner cylindrical surface of the front end of the body 101.

The body 101 is provided with an outer radial flange 115 intended to interact with the tooth 72, in a manner known from FR-A-2 514 855.

The front face 126 of the valve 102 and the front face 116 of the body 101 are substantially co-planar and perpendicular to axis $X_B$–$X'_B$ in the configuration of FIG. 1.

The body 1 includes an outer radial surface 113 at its front end and 114 denotes the joining edge between this surface 113 and a fixed front engaging face 116, this edge 114 being circular.

The face 115a of the flange 115 which is perpendicular to axis $X_B$–$X'_B$, is intended to come into abutment against a face 72a of the tooth 72 which is perpendicular to axis $X_A$–$X'_A$, as shown in FIG. 3.

The outer radial surface of the body 101 comprises three cylindrical surfaces 101a, 101b and 101c whose diameter decreases towards the front of the body 1 and which are connected in two's by truncated surfaces 101d and 101e.

The male element B is intended to be introduced in the female element A in the direction of arrow $F_4$ in FIG. 2. In order to obtain an efficient guiding of the male and female elements along their axis of fit X–X' which merges with axes $X_A$–$X'_A$ and $X_B$–$X'_B$ in that case superposed, the body 1 is provided with a truncated surface 18a which is formed in the vicinity of the stop 18 and intended to guide the edge 114 in order to centre it with respect to axis $X_A$–$X'_A$ and allow it to slide over a cylindrical surface 18b of circular section, centered on axis $X_A$–$X'_A$, which extends the surface 18a and whose radius is slightly greater than that of the surface 113. The interaction of the zones or surfaces 18a and 18b on the one hand, 113 and 114 on the other hand, therefore allows a guiding of the front end of the element B when it is being introduced in the element A.

In addition, the circular surface 19 which defines the opening 16a has a radius substantially equal to that of the outer radial surface 115b of the flange 115 and to that of the surface 101b, this making it possible to obtain a guiding of the male element with respect to the female element when the flange 115 passes in the opening 16a and when that part of the body 101 surrounded by the surface 101b is in this opening, as shown in FIG. 3.

As is more particularly visible in FIG. 2, the movement of introduction of the element B in the element A has the effect of bringing the surfaces 116 and 126 into surface abutment against the surfaces 26 and 46. If the movement of fit is continued and the configuration of FIG. 3 is attained, the valve 2 is pushed by the front face 116 of the body 101, while the valve 102 is pushed by the head 41 of the pusher element 4, this making it possible to detach the valves 2 and 102 from their respective seats 12 and 112 and allowing the flow of fluid under pressure, as represented by arrows E in FIG. 3.

In order to attain this configuration, the inclined surface 113c of the flange 115 has pushed the tooth 72 against the effort $F_2$, sliding over its inclined surface 72c, then the flange 115 is locked at the rear of the tooth 72, as shown in this same FIG. 3.

While the male element B is being fitted in the female element A, the front part of the body 101 comes, by its planar front face 116–126, into contact with the planar face 26–46 of the female element. The continuing movement of fit induces the passage of the flange 115 in the opening 16a then the slide of the outer radial surface 115b of the flange 115 over the lower part of the surface 71. That part of the body 101 defined by the surface 101b then penetrates in the opening 16a. From the position of FIG. 2, the continuing movement of fit also induces a slide of the surface 113 over the surface 18b. In this way, an efficient guiding is obtained when the elements A and B are fitted together.

When the elements of the connection are to be uncoupled, it suffices to exert on the button 7 an effort $F_5$ directed towards the bottom 17a, which has the effect of retracting the tooth 72 with respect to the flange 115, the valve 102 in that case being pushed by the effort $F_1$ and by the pressure of the fluid, this inducing a closure of the female element by return of the valve 2 towards its position of FIG. 1 and a closure of the male element by recoil of its body 101, which corresponds to a return of the valve 102 towards the seat 112.

The invention may be employed to constitute a circuit for circulation of heat-exchange fluid in the direction of arrow E in FIG. 3, or in the opposite direction, with a view to cooling electrical or electronic equipment. In effect, with the invention, the device formed by the button 7 may be of relatively modest size, likewise the bodies 1 and 101, this allowing large numbers of connecting elements A and B of small dimensions to be produced in order to create cooling systems for control boxes, particularly for data-processing servers.

The invention has been shown when employed in a connection of which the associated valves and fixed parts form, when the male and female elements are separated, planar faces 26–46 and 116–126 which are made, for one, in the female element and, for the other, in the male element and are perpendicular to axes $X_A$–$X'_A$, $X_B$–$X'_B$ and X–X'. This proves to be particularly advantageous as the imprisonment of fluid is eliminated during the fit.

However, a variant with stepped front faces may be envisaged, in accordance with an approach similar to that shown in FR-A-1 561 337. Similarly, variants with conical or spherical faces may be envisaged. Whether these surfaces be planar, stepped or skew, they define substantially complementary volumes, respectively on the male element and on the female element, this avoiding the creation of a dead volume capable of generating drainings or leakages during the successive openings/closures of the connection.

What is claimed is:

1. Quick connect coupling for removably joining two pipes through which a fluid under pressure may flow, said coupling including a male element adapted to fit axially within a female element, each of said male and said female elements including a body inside which a valve is movably mounted between a closed position and an open position, each of said male and female elements including a pusher element having an engaging surface for engaging a face of an opposing valve such that said pusher elements are adapted to displace said opposing valve of the other of said male and female elements when said elements are being fitted one within the other, said female element including a lock member in which may be introduced an end portion of said male element and which lock member is reciprocally movable in a radial direction with respect to an axis of fit of said male and female elements, between a first position in which said lock member allows said male and female elements to be separated when said male element is mounted within said female element, and a second position where said lock member opposes a withdrawal of said male element from said female element, and said engaging surface and said valve face of each of said male element and said female element define abutment surface areas of substantially equal diameter that engage each other in such a manner that no open volume is defined there between when said male element is locked within said female element to thereby deter fluid leakage between said male and female elements as they are disconnected from one another.

2. The quick connect coupling of claim 1, wherein said body of said female element forms, on either side of said lock member along said axis of fit of said male and female elements, two guiding zones that cooperatively guide two parts of said male element for axially guiding said male and female elements when they are fitted together.

3. The quick connect coupling of claim 1, wherein said valve of said female element is centered on a head of said pusher element that is fixed with respect to said body of said female element, a front face of said body of said male element forming said engaging surface of said pusher element thereof that engages said face of said valve of said female element, and said engaging surface of said female element is formed on said head.

4. The quick connect coupling of claim 1, wherein said engaging surfaces of said pusher elements and said faces of said valves are planar and oriented substantially perpendicular to a longitudinal axis of a corresponding male or female element.

5. The quick connect coupling of claim 1, wherein said lock member is disposed in a housing in said female element that opens to an outer radial surface of said body thereof.

6. The quick connect coupling of claim 1, wherein said male element is provided with at least one element in relief adapted to cooperate with at least one element in relief of complementary shape of said lock member for retaining said male and female elements in coupled configuration.

7. The quick connect coupling of claim 6, wherein said element in relief of said male element is a radial flange that extends outwardly from said body of said male element.

8. The quick connect coupling of claim 6, wherein said element in relief of said lock member is a tooth made on an inner radial surface of said lock member.

9. The quick connect coupling of claim 1, including resilient means for elastically urging said lock member towards said second position.

10. A method for circulating a heat-exchange fluid to cool electronic equipment using at least one quick connect coupling to connect first and second pipes together, the method comprising;

A. providing a quick connect coupling for removably joining the two pipes through which a fluid under pressure may flow, wherein the coupling includes a male element adapted to fit axially within a female element, each of the male and the female elements including a body inside which a valve is movably mounted between a closed position and an open position, each of the male and female elements including a pusher element having an engaging surface for engaging a face of an opposing valve such that the pusher elements are adapted to displace the opposing valve of the other of the male and female elements when the elements are being fitted one within the other, the female element including a lock member in which may be introduced an end portion of the male element and which lock member is reciprocally movable in a radial direction with respect to an axis of fit of the male and female elements, between a first position in which the lock member allows the male and female elements to be separated when the male element is mounted within the female element, and a second position where the lock member opposes a withdrawal of the male element from the female element, and the engaging surface and the valve face of each of the male element and the female element define abutment surface areas of substantially equal diameter that engage each other in such a manner that no open volume or voids are defined there between to thereby deter fluid leakage between the male and female elements;

B. connecting the male element to the first pipe and the female element to the second pipe; and thereafter C. connecting the male element within the female element by relative movement of at least one of the male and female element along the axis of fit to thereby simultaneously open the valves within the male and female elements to permit flow between the first and second pipes.

* * * * *